United States Patent
Nguyen et al.

(10) Patent No.: US 7,499,533 B2
(45) Date of Patent: Mar. 3, 2009

(54) SYSTEM AND METHOD FOR CALLER CONTROLLED TIME DEMARCATION

(75) Inventors: Hong Thi Nguyen, Atlanta, GA (US); Linda Ann Roberts, Decatur, GA (US); Edward Michael Silver, Atlanta, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 821 days.

(21) Appl. No.: 10/003,554

(22) Filed: Nov. 2, 2001

(65) Prior Publication Data

US 2003/0108178 A1 Jun. 12, 2003

(51) Int. Cl.
*H04M 11/00* (2006.01)
(52) U.S. Cl. .................. 379/114.09; 379/114.09; 379/114.13; 379/104.01
(58) Field of Classification Search ........... 379/221.11, 379/221.08, 221.1, 114.09, 114.13, 114.17
See application file for complete search history.

(56) References Cited

U.S. PATENT DOCUMENTS

| 5,524,145 | A | | 6/1996 | Parker |
| 5,559,871 | A | * | 9/1996 | Smith .................. 379/115.01 |
| 5,815,561 | A | | 9/1998 | Nguyen et al. |
| 5,987,108 | A | * | 11/1999 | Jagadish et al. ........ 379/114.01 |
| 6,009,150 | A | * | 12/1999 | Kamel ..................... 379/88.22 |
| 6,178,231 | B1 | | 1/2001 | Nabkel .................. 379/115.01 |
| 6,590,970 | B1 | * | 7/2003 | Cai et al. ............... 379/221.11 |
| 6,735,290 | B1 | * | 5/2004 | Rauba .................... 379/114.16 |

* cited by examiner

*Primary Examiner*—Ahmad F Matar
*Assistant Examiner*—Karen L Le
(74) *Attorney, Agent, or Firm*—Cantor Colburn LLP

(57) ABSTRACT

A method and system for providing a caller-controlled demarcation service is described. An embodiment of the present invention is advantageously implemented as an advanced service in an intelligent telecommunications network. An embodiment of the present invention allows the user to specify an interval for a telephone communication. A telecommunication switch times the communication and when the interval expires, the switch either plays a tone to signal the expiration or disconnects the call. The switch may enforce the interval for calls originating or terminating at the subscriber's phone.

38 Claims, 8 Drawing Sheets

FIG. 1 – Prior Art

SYSTEM AND METHOD FOR CALLER CONTROLLED TIME DEMARCATION

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention relates generally to advanced telecommunications services. The present invention relates more particularly to caller-controlled demarcation of communications.

BACKGROUND

A common challenge facing parents in relation to conventional telephones is the propensity of teenagers to overuse the telephone. Despite the best efforts of parents, it has proven difficult to control this propensity. Parents have a strong desire to limit the duration of their teenagers' calls to the extent possible to both reduce their monthly phone bill and increase the availability of their phone. Additionally, other telephone subscribers may wish to limit the number and duration of phone calls and other telecommunications for a variety of reasons, including attempting to reduce the size of their monthly telephone bill.

Various conventional methods for monitoring or limiting the duration of a call exist. For example, many conventional business-style phones, such as those connected to private branch exchanges (PBX), include a timer, which is activated when a phone call begins. By monitoring the display, a caller can determine the running duration of the call and end the call when the desired duration has expired. However, the phone itself includes no mechanism to limit the duration of the call and neither does the underlying telecommunications system. The phone merely provides an indication of the length of the call. For a subscriber wishing to limit the duration of calls by other parties, an indicator provides little value.

Another indicator of call duration is the periodic phone bill. The phone bill provides feedback to the subscriber of the duration of calls to various directory numbers. However, the phone bill is historical and provides no ability to limit the duration of currently-occurring calls.

Other methods exist for limiting the actual duration of calls. For example, the patent granted Nguyen, et. al., U.S. Pat. No. 5,815,561, describes "a method and system for apprising the parties to a communication of the duration of the communication while the communication is in progress." Nguyen dismisses having a caller set up a call demarcation as inefficient and time-consuming. Also, Nguyen does not teach demarcation for a call terminating at the subscriber's phone.

Conventional methods and systems also provide for limiting a call placed using a prepaid calling card. A subscriber provides the prepaid calling card number when placing the call. Based on the billing rate for a particular phone call, an the duration of the call is calculated as a time period equal to the monetary value on the prepaid card divided by the billing rate for the call. If the time period expires during the call, the call is disconnected. In any event, when the call ends, the duration of the call is deducted from the prepaid card balance.

In comparison to a caller-controlled demarcation, several limitations exist when using prepaid cards. One obvious limitation of a prepaid calling card is that the card must be purchased before a call can be placed using the card. Also, the card must be replaced or have value added when the monetary value of the card is depleted. Additionally, a caller may apply the monetary value of the prepaid card to any call. No system or method exists to limit specific calls to only a portion of the prepaid card or to only specific directory numbers.

For these reasons and others, a system and method is needed to provide an indicator or to limit the duration of phone calls and other communications. It would be most advantageous if the system and method were embodied as a service in an intelligent network, allowing a subscriber to vary the time limit of calls placed to or received from various directory numbers and to apply the limit to various time periods. It would also be advantageous to provide the subscriber with the ability to set the limit at any time, including during the instantiation of a call subject to the time limit.

SUMMARY

Embodiments of the present invention address these deficiencies in conventional systems and methods by providing systems and methods for caller-controlled time demarcation. An embodiment of the present invention is advantageously embodied as a service in an intelligent telecommunications network. In such a network, a service control point provides a platform for configuration and implementation of the demarcation service.

In an embodiment of the present invention, the intelligent network comprises an advanced intelligent network (AIN). The AIN comprises a switch, such as a service switching point, in addition to the service control point. The AIN also comprises high-speed signaling system 7 (SS7) links between the switch and service switching points. The AIN also comprises analog and digital connections to terminals, such as telephones, faxes and other devices.

The switch receives a communication from a terminal and requests communication-handling instructions from the service switching point. The service control point receives the communication from the switch and in response, searches a database to determine if any advanced services are associated with either the originating or terminating terminal and communicates this information to the switch. The switch then performs functions in accordance with the instructions.

In an embodiment of the present invention, a telecommunications service provider utilizes the AIN components to provide the caller-controlled demarcation service to the provider's subscribers. The subscribers may subscribe to the demarcation service explicitly or may use the service when desired without first subscribing to it. When a subscriber subscribes to or uses the demarcation service, the subscriber performs configuration tasks, including specifying demarcation information.

The demarcation information includes a demarcation interval. The demarcation interval is a period of time or a monetary amount. In an embodiment of the present invention, when the switch receives a communication, the switch pauses and sends a message to the service control point, requesting communication-handling instruction. The service control point queries a database and determines that the demarcation service applies to the communication. The service control point finding an entry indicates that the subscriber subscribed to the demarcation service and during the subscription process, provided a default demarcation interval. The service switching point determines the demarcation interval and communicates the communication-handling instructions, including the demarcation interval to the switch.

In an embodiment of the present invention in which the demarcation interval is stored as a monetary value, the service switching point determines the billing rate of the call, divides the billing rate into the demarcation interval to determine a demarcation interval expressed as a time period, and sends a message comprising the time period to the switch.

The switch monitors the duration of a communication, and, when the demarcation interval has or is about to expire, signals the expiration and/or disconnects the communication. The switch may signal the expiration of the demarcation interval by playing a beep, click or other signal to the subscriber's phone, indicating the expiration.

In one embodiment of the present invention, prior to the expiration of the demarcation interval, the system plays a warning tone to inform the individual using the subscriber's phone that the demarcation interval is about to expire. The period of time prior to expiration may comprise one minute or any other period specified by the subscriber or service provider.

When the communication ends, either because the switch disconnected the communication or because the parties to the call ended it, the switch sends a message to the service switching point, identifying the communication and specifying its duration. In response, the service switching point deducts the duration of the communication from the total demarcation interval stored in the service switching point.

A demarcation interval applies to a specific time period, for example, a day, week, month, or year. The demarcation interval represents the total duration of a call or group of related calls during the specified period. For example, if the demarcation interval for calls between the subscriber's phone and another directory number is 60 minutes and the time period to which the demarcation interval applies is daily, phone calls to and from the subscriber's phone and the other number may not exceed 60 minutes during any twenty-four hour period. The demarcation interval may apply to the directory number of the subscriber's phone as either the origination or termination point in a communication.

In one embodiment of the present invention, the demarcation information comprises a default demarcation interval that applies to all communications, including communications wherein the subscriber's directory number is either the origination or termination point. In another embodiment of the present invention, the demarcation information comprises a plurality of directory numbers to which varying demarcation intervals apply. For example, the subscriber may specify that demarcation does not apply to calls to specified directory numbers. Also, the subscriber may specify a default demarcation interval that applies only to a limited set of directory numbers and no others.

For example, a subscriber may desire to limit calls between the subscriber's phone and the directory number of a friend of the subscriber's child. In an embodiment of the present invention, the subscriber specifies the directory number of the child's friend, the demarcation interval, and the time period to which the interval applies. When a call is subsequently placed between the subscriber's phone and the child's friend's directory number, the call is subject to the demarcation interval. The demarcation interval applies when either the subscriber's child or the child's friend initiates a communication that includes the subscriber's phone as the origination or termination point.

A subscriber may enter a demarcation interval as a time value or as a monetary value. If the interval is a monetary value, an embodiment of the present invention uses the billing rate for a specific call to convert the monetary value to a period of time applicable to the specific communication. The time period represented by the monetary value varies depending on various factors, including the time of day and physical distance the communication traverses.

The demarcation interval may apply to both voice and data communications. For example, a subscriber may wish to limit the number of minutes the subscriber's phone is connected an Internet service provider (ISP) in order not to exceed the number of access minutes provided in the subscribers service agreement with the ISP.

In an embodiment of the present invention, a subscriber or a user of the subscriber's telephone may specify a demarcation interval that is less that the default. A subscriber may also specify a demarcation interval that is greater than the default by specifying the demarcation interval and supplying a password. For example, the subscriber may specify that the limit does not apply to a specific communication or that the demarcation interval for the particular communication is infinite.

When the subscriber or user specifies an override demarcation interval and supplies a password, the switch receives the entry and sends it to the service switching point. The service switching point compares the demarcation interval to the default demarcation interval, and if the entered demarcation interval is greater, validates the password. If the password is valid, the service switching point instructs the switch to use the entered demarcation interval rather than the default demarcation interval. In response to the communication from the service switching point, the switch routes the call and begins timing it.

An embodiment of the present invention bills a subscriber for the use of the service. A system and method according to the present invention may bill a subscriber a monthly rate for providing the demarcation service. The subscriber may be charged on a per-use basis for the service instead. Other embodiments of the present invention may combine these billing methods and/or others.

An embodiment of the present invention offers numerous advantages over conventional approaches. First, an embodiment of the present invention offers potential cost savings to both a subscriber and a provider of demarcation services. An embodiment of the present invention provides a telephone subscriber with a means to limit phone calls placed from and to the subscriber's phone in general and to specifically limit phone calls to specified directory numbers. By allowing the subscriber to specify limits on the duration of phone calls, an embodiment of the present invention potentially reduces the periodic charges that the subscriber pays for phone service.

Also, by providing an automated means for a subscriber to enter and modify demarcation information, an embodiment of the present invention reduces the number of customer service representatives the service provider must make available to support the service. This reduction in human resources requirements provides a cost savings to the provider.

An embodiment of the present invention provides numerous other advantages as well. An embodiment of the present invention lessens the likelihood that a user of the subscriber's phone can elude the limitations placed on phone calls. For example, a user of the subscriber's phone may attempt to avoid the demarcation limit by having another party originate a communication to the subscriber's phone. An embodiment of the present invention prevents this attempt by applying the demarcation interval to calls both originating and terminating at the subscriber's phone.

Also, an embodiment of the present invention operates in a manner that is similar to a pre-paid calling card in that a monetary limit may be placed on a call. However, in an embodiment of the present invention, the caller specifies the demarcation interval as a monetary value. In the case of a pre-paid card, the duration of the call may extend to any duration, so long as the monetary value represented by the card is not exceeded. No limit may be placed on specific directory numbers or applied to specific periods of time. An embodiment of the present invention provides the subscriber with the ability to set demarcation intervals with better specificity.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for caller-controlled time demarcation of voice-channel communications. An embodiment of the present invention is advantageously embodied in an intelligent telephone network, such as an advanced intelligent network. A user of an embodiment of the present invention accesses the demarcation service, utilizing a special code or dialing a number, enters a password, and specifies demarcation information, including a demarcation interval. Once the subscriber specifies a demarcation interval, during subsequent calls to which the demarcation interval applies, the service either causes the playing of a tone or message or causes the disconnection of the call after a period of time equal to the demarcation interval.

A service provider may provide an embodiment of the present invention to all the provider's subscribers. A subscriber may access the service at any time and need not subscribe to the service prior to using it. A mobile telecommunications service provider in a mobile telecommunications network may also provide the demarcation service.

Advanced Intelligent Network

Figure 1:
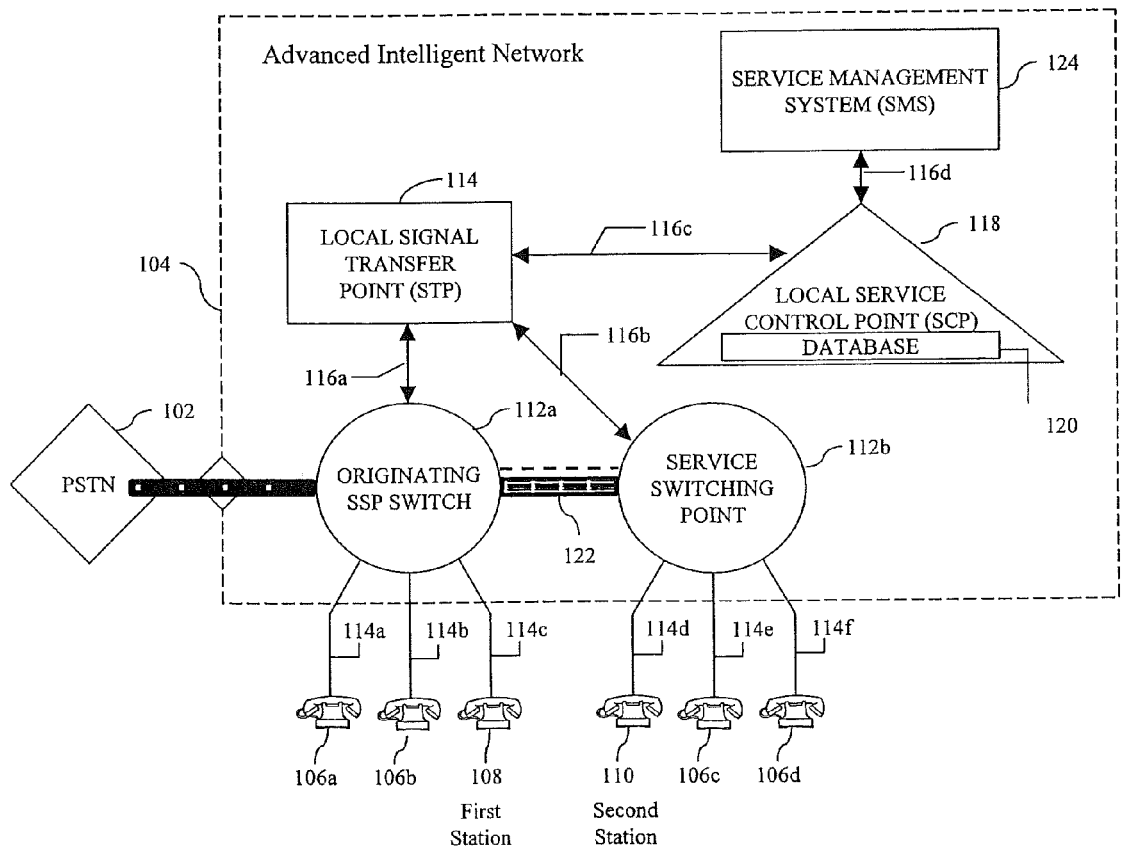
FIG. 1 is a diagram of a prior art advanced intelligent network, which serves as an exemplary environment for operation of an embodiment of the present invention.

FIG. 1 is a block diagram of a prior art public switched telephone network (PSTN) 102 and an advanced intelligent network (AIN) 104. An embodiment of the present invention is advantageously embodied as a service in AIN 104. For the sake of brevity, only a basic description of the AIN is provided herein. For further information regarding aspects of the AIN, refer to Nguyen, U.S. Pat. No. 5,815,561, which is incorporated herein by reference.

PSTN 102 represents a voice telecommunications network. PSTN 102 comprises a plurality of telecommunication equipment, including various AIN components. AIN 104 illustrates the telecommunications components typically owned or administered by a local exchange carrier. These components communicate out-of-band over signaling system 7 (SS7) links 116. SS7 is a standard protocol for setting up calls and providing communication features within AIN 104.

A local exchange carrier locates AIN components in various physical locations to ensure the most efficient utilization of each component. For example, AIN 104 comprises a plurality of central offices (not shown). A central office comprises AIN components, including voice switches for providing voice-line communications services. Voice-line communication comprises both voice and data services, such as dial-up Internet access. A voice switch may incorporate or communicate with a service switching points (SSP), illustrated as service switching points 112a and 112a. An SSP 112a provides intelligent call handling and routing. "SSP" and "switch" are used interchangeably herein to refer to an intelligent voice telecommunications switch.

Switches are interconnected through a series of communication links called trunks. Switches utilize trunks to establish communication links between terminals, such as telephones, faxes, and modems. Referring to FIG. 1, SSP 112a and SSP 112b are interconnected by trunk 122. SSP 112a provides switching and additional intelligent network functionality by working in conjunction with various other components of an AIN 104. For example, SSP 112a communicates with a local signal transfer point (STP) 114. An STP, illustrated by STP 114 in FIG. 1, is a packet switch that routes communication requests between the various elements in AIN 104, including SSP 112a and service control points, as illustrated by SCP 118 in FIG. 1.

For example, SSP 112a sends a query message in response to a trigger to STP 114. Although FIG. 1 includes a single SCP 118 for illustration purposes, AIN 104 comprises a plurality of additional SCPs as well (not shown). STP 114 queries its database (not shown) to determine to which SCP the query message from SSP 112a is to be directed.

SCP 118 provides program logic, translation, and routing data required to deliver advanced network features, such as calling card, 800, and other services. To support such advanced features, SCP 118 accesses a database 120. SCP 118 may incorporate a database, such as database 120, or may access a database on a separate computer (not shown). To ensure continuity of service an SCP 118 generally comprises redundant fault-tolerant computers. Also, AIN 104 incorporates SCPs in tandem to further insure continuity of service.

SSP 112a and SCP 118 communicate via transactional capabilities application part (TCAP) messages over signaling system 7 (SS7) links. TCAP comprises the top layer of the SS7 protocol and supports transactional, non-circuit related, exchange between AIN 104 components.

A terminal initiates a communication. In the embodiment shown in FIG. 1, terminals are represented by telephones 106, 108, 110. However, numerous devices may operate as terminals in an embodiment of the present invention.

Terminals initiate communications at switches. The terminals communicate with the switches via analog or digital communication channels 114. A communication may comprise a single terminal, such as first station 108. For example, if a subscriber wishes to perform administrative functions, such as setting up a demarcation interval in an embodiment of the present invention, the subscriber uses first station 108 to initiate a communication with SSP 112a. No other terminals are involved in the transaction.

When SSP 112a receives a communication from first station 108, a trigger occurs. A trigger is an event in the AIN 104 that causes the SSP 112a to send a message to the SCP 118, requesting instructions for how to handle a communication. In response, the SCP 118 provides instructions to the SSP 112a. The instructions may include a directive to play an announcement, route the call, collect digits, or perform other tasks necessary to provide an advanced service.

When an SSP 112a identifies a trigger and pauses to send a message, the SSP 112a opens a transaction, which causes an allocation of the memory of SSP 112a. Also, when the SCP 118 receives a message from the SSP 112a, the SCP 118 opens a transaction, causing an allocation of memory on the SCP 118. The memory allocated on the SSP 112a and SCP 118 remains allocated until the bi-directional communication between the two components ends and the transaction is closed. Therefore, it is advantageous to maintain open transactions only as long as necessary so that the memory allocated for the transaction may be deallocated and utilized to support additional transactions.

An embodiment of the present invention utilizes an AIN software release 0.1 or higher. For more information see, see Bellcore Specification TR-NWT-001284 Switching Systems Generic Requirements for AIN 0.1, which is incorporated herein by reference. AIN software supports a call model comprising points in call (PIC), trigger detection points (TDP), and triggers. SSP 112a checks at each TDP to see if there are any active triggers. If SSP 112a detects an active trigger, call processing is paused until the SSP 112a and SCP 118 complete a transaction. AIN release 0.1 and higher includes a formal call model, which comprises both originating and terminating call models.

AIN 104 may comprise additional components as well. For example, AIN 104 includes a service management system (SMS) 124. SMS 124 allows the creation and maintenance of information relating to subscribers and services in near real-time for both billing and administration of AIN 104. SMS 124 downloads information to the databases of SCP 118 when subscribers add or modify AIN services. Also, SMS 124 downloads billing information necessary to bill subscribers for AIN services.

Configuring Caller-Controlled Call Demarcation

Figure 2:
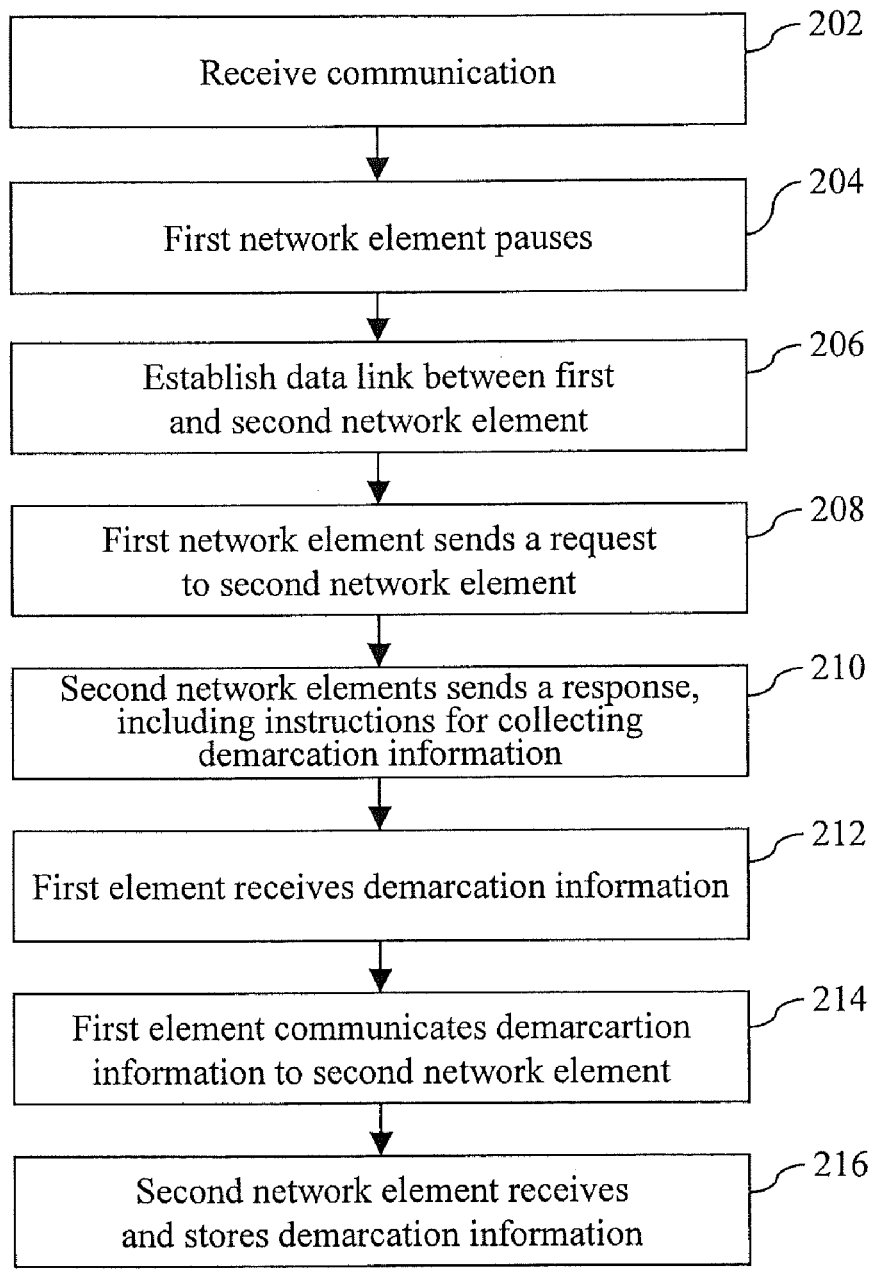
FIG. 2 is a flowchart illustrating the process of configuring call demarcation in an embodiment of the present invention.

In an embodiment of the present invention, the subscriber to the demarcation service may set up the demarcation service by subscription, setting a default demarcation interval, or may instead activate the demarcation service for specific calls to and from the subscriber's phone. Also, an embodiment of the present invention is not limited to applying the demarcation limit to communications to a specific device. The demarcation interval may be applied to various devices to which communications intended for the subscriber are directed. FIG. 2 provides a general description of the process of configuring a caller-controlled demarcation service.

In an embodiment of the present invention, the subscriber uses a terminal, such as first station 108 shown in FIG. 1, to access the caller-controlled call demarcation service. The subscriber may access the service by various methods, including dialing a specific directory number or using a special access code in the form, *##. Referring to FIG. 2, a first network element, SSP 112a, receives the communication 202 across a voice channel communication link. 114c. The user has a *XX feature code trigger on the line to allow them to dial the *XX code. The SSP 112a receives this code 204.

SSP 112a sends a request for call-handling instructions over an SS7 link to SCP 118 via STP 114, 208. When STP 114 receives the request, STP 114 searches a table (not shown) to determine the address of SCP 118 and forwards the request to SCP 118.

SCP 118 includes logic, including a caller-controlled call demarcation entry component, and a database 120, which includes a demarcation information data store. In response to receiving the request from SSP 112a, SCP 118 opens a transaction and responds, instructing SSP 112a to play an announcement requesting the subscriber to enter the demarcation information, including the demarcation interval 210. The demarcation information may include other parameters as well.

For example, the subscriber may specify a time period to which the demarcation interval applies. Also, the subscriber may specify directory numbers to which the demarcation interval applies.

A demarcation interval may apply to a single call or may apply to calls occurring during a specific time period, for example, a day, week, month, or year. The demarcation interval represents the total duration of a call or group of related calls during the specified period. For example, if the demarcation interval for calls between the subscriber's phone and another directory number is 60 minutes and the time period to which the demarcation interval applies is daily, phone calls to and from the subscriber's phone and the other number may not exceed 60 minutes during any twenty-four hour period. The demarcation interval may apply to the directory number of the subscriber's phone as either the origination or termination point in a communication.

Referring again to FIG. 2, SSP 112a receives the demarcation information 213 and communicates the information to SCP 118, 214. The SCP 118 receives the demarcation information and stores it in the database 120, 216.

After the subscriber has configured the demarcation service, any calls placed to or from the subscriber's phone may be subject to a demarcation interval. As stated herein, the subscriber may also initiate the demarcation service on a call-by-call basis without performing an initial configuration.

For example, prior to beginning a conversation, the subscriber may specify that the demarcation interval applied to the current call is thirty minutes. The subscriber may further specify that when the demarcation interval expires, the switch should simply supply an indicator rather than disconnecting the communication. In this way, the subscriber is reminded to complete the call at the end of thirty minutes, but the subscriber is not abruptly cut off.

Figure 3:
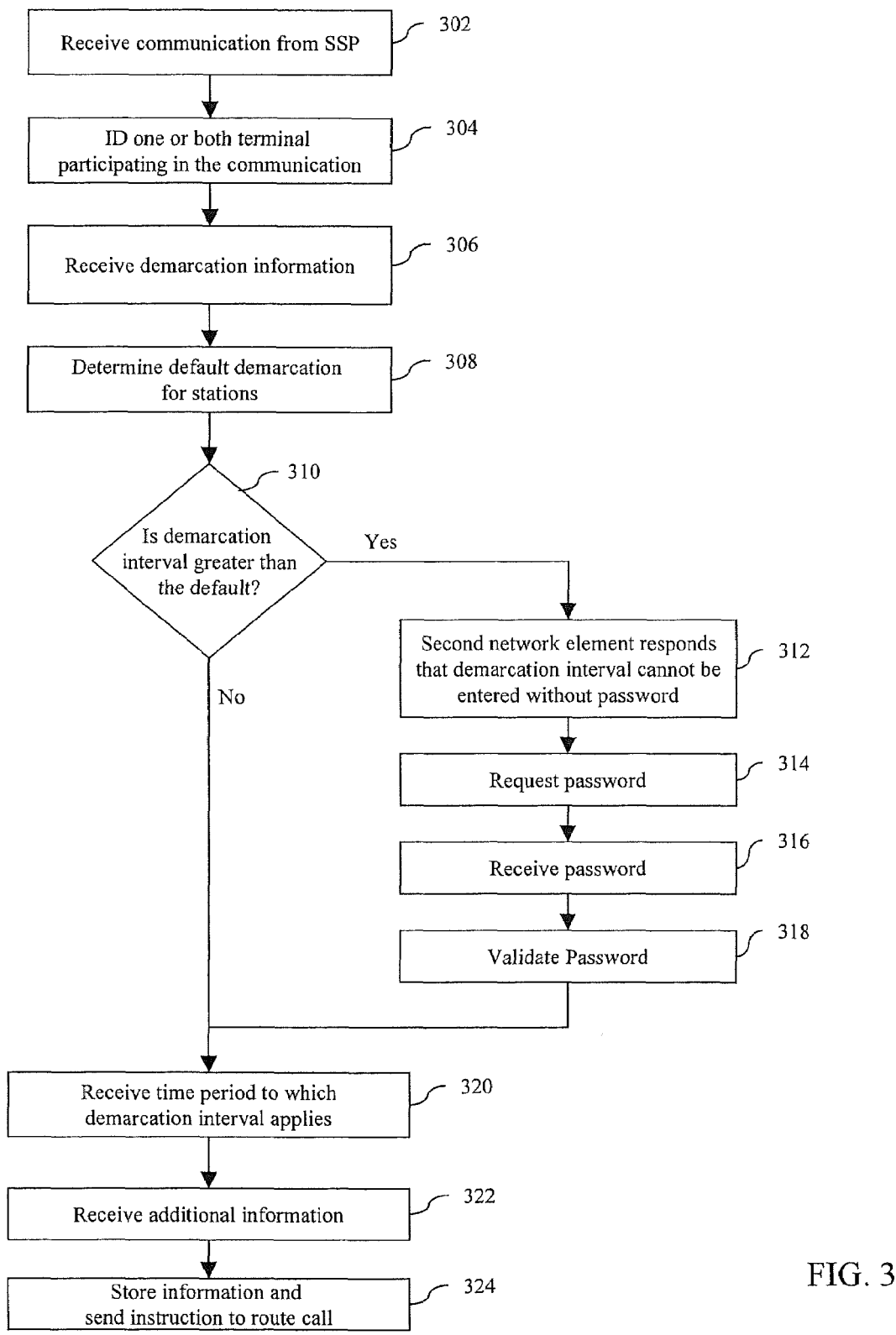
FIG. 3 is a flowchart illustrating an overview of the call-handling process in an embodiment of the present invention.

FIG. 3 illustrates the process an SCP 118 executes to handle a call subsequent to initial configuration of the demarcation service. In the embodiment shown in FIG. 3, the SCP 118 receives a communication from an SSP 112a, 302. The communication from the SSP 112a includes information for identifying the terminal or terminals that are to participate in the communication, such as first station 108 and second station 110. The SCP 118 uses this information to identify the terminals and queries database 120 to determine if any services are associated with either terminal 304.

In the process shown in FIG. 3, the SCP 118 also receives demarcation information, including a demarcation interval, from the SSP 112a, 306. The SCP 118 queries the database 120 to determine the default demarcation interval specified by the subscriber during configuration as illustrated in FIG. 2 308. In the case of the process illustrated in FIG. 3, the SCP 118 finds a default interval in database 120. The SCP 118 compares the default interval with the demarcation interval received from the SSP 112*a* to determine if the provided interval is greater than the default interval 310.

If the demarcation interval entered is greater than the default interval, the SCP 118 sends a message to the SSP 112*a*, requesting an announcement be played that states that a demarcation interval greater than the default may not be entered without a password 312. The SCP 118 also requests the SSP 112*a* to collect the subscriber's password 314. The SSP 112*a* plays the announcement, collects the password, and sends it to the SCP 118 for verification. SCP 118 receives the password 316 and validates it 318. In another embodiment of the present invention, the subscriber provides the demarcation interval and the password in a single communication If either the provided demarcation interval is less than or equal to the default interval or the subscriber enters a valid password, the process shown in FIG. 3 continues to step 320. The subscriber may specify a period of time to which a demarcation interval applies. For example, a subscriber may allow a total of 60 minutes of calls between the subscriber's and another phone per day. The subscriber may also specify that phone calls to all numbers may not exceed 240 minutes per week. The SCP 118 receives the time period for the demarcation interval 316. The SCP 118 may also search database 120 for a stored time period to apply to a demarcation interval.

SCP 118 may receive additional information as well 322. For example, a subscriber may specify the directory numbers to which a demarcation interval applies. The parameters described herein in relation to the caller-controlled demarcation service are not exhaustive. A subscriber may specify many additional parameters. Once the subscriber has specified all desired parameters, the SCP 118 stores the parameters in database 120, and instructs SSP 112*a* to route the call 324.

Demarcated Call Handling Service in an AIN

Figure 4A:
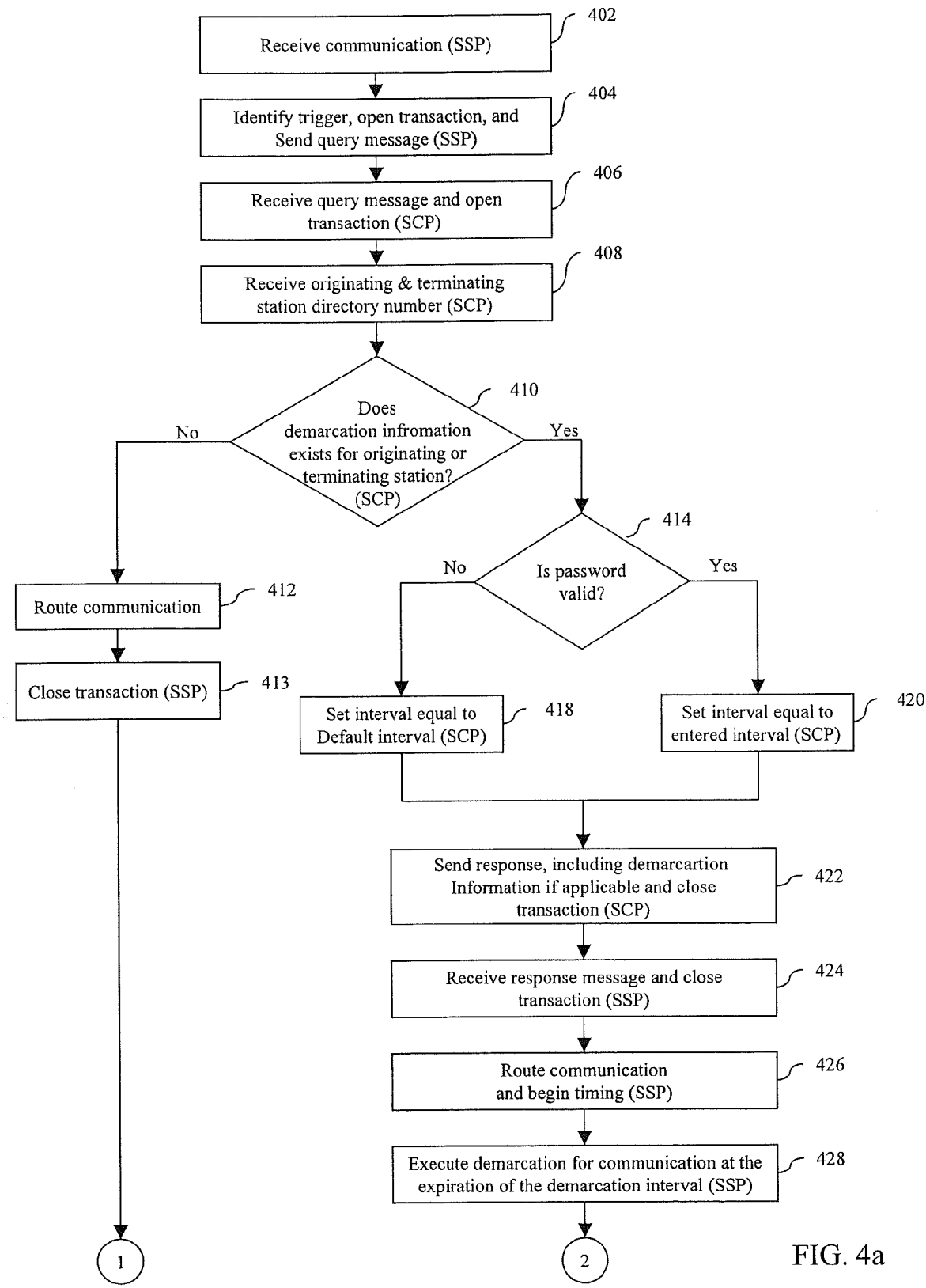
FIGS. 4a and 4b are a flowchart illustrating the process of handling a call in an active intelligent network in an embodiment of the present invention.
Figure 4B:
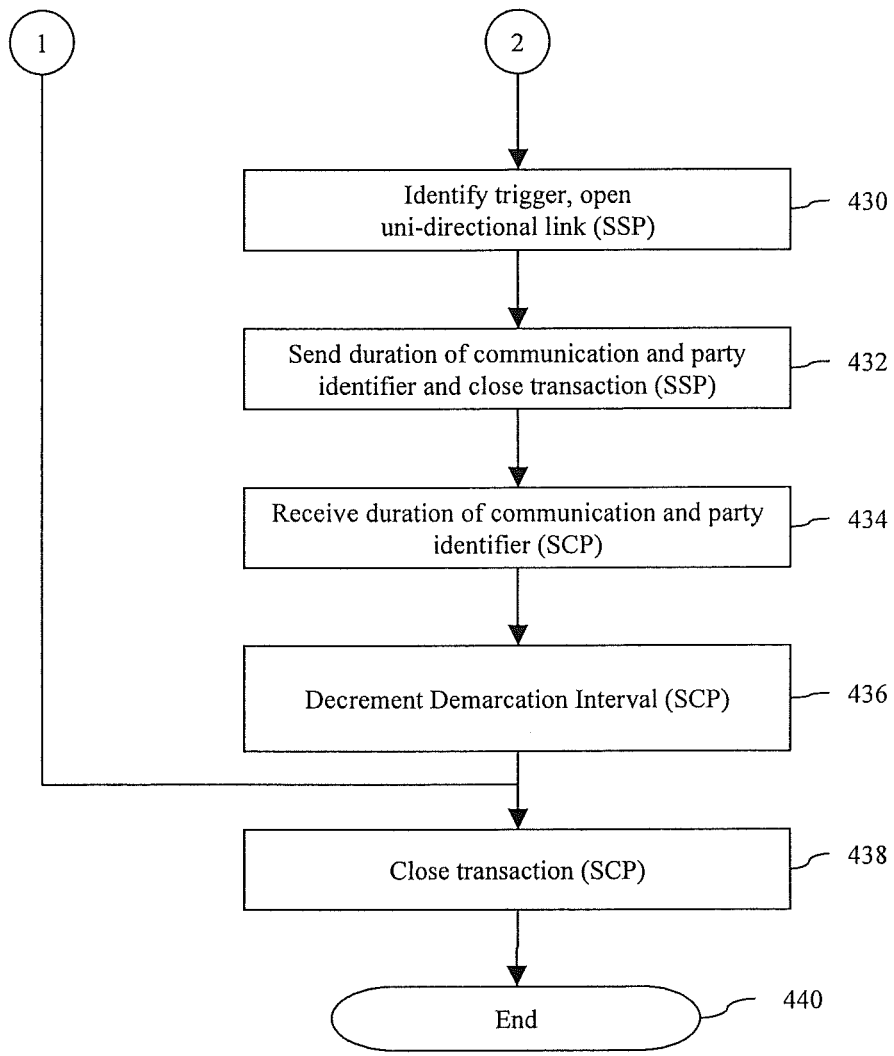

In an embodiment of the present invention, once the subscriber has specified the parameters for demarcated call handling, the AIN 104 implements the call demarcation service for calls originating from or terminating at the subscriber's telephone. FIGS. 4*a* and 4*b* illustrate the process for handling calls in an AIN 104 to and from the subscriber's phone subsequent to call demarcation configuration.

In an embodiment of the present invention, a party places a call from the subscriber's phone, first station 108, to another phone, for example, second station 110. SSP 112*a* receives the communication and pauses 402. SSP 112*a* identifies the appropriate trigger, opens a transaction, and sends a query message to SCP 118 via STP 114, 404. SCP 118 includes logic, including a call demarcation component, and a database 120, which includes a demarcation information data store. The query message comprises information identifying first station 108 and the target termination point, second station 110, as well as other information necessary to identify the call.

SCP 118 receives the query message and opens a transaction 406. The SCP 118 receives the originating and terminating station directory numbers 408. SCP 118 receives any additional information included in the query message as well. In response, SCP 118 performs a query of database 120 to determine whether any advanced services, such as demarcation, are to be applied to the communication. In the process shown in FIG. 4*a*, SCP 118 queries database 120 to determine whether demarcation information exists for either the originating station, first station 108, or the terminating station, second station 110, 410.

An embodiment of the present invention will provide demarcation for a subscriber's phone as either the originating or terminating station. For example, if the subscriber sets up a demarcation interval for calls between first station 108 and second station 110. The AIN 104 may enforce the demarcation interval on calls placed from second station 110 to first station 108 as well as calls placed from first station 108 to second station 110.

If the SCP 118 finds no demarcation information that is applicable to a communication between first station 108 and second station 110, SCP 118 sends a message to SSP 112*a*, instructing SSP 112*a* to route the call. The SSP 112*a* routes the call 412 and closes the transaction 413 and continues with step 438 in FIG. 4*b*. However, if a demarcation interval does exist, the SCP 118 may also receive a demarcation interval override and password in the message from SSP 112*a*.

A call originating from first station 108 to which demarcation applies is subject to the default demarcation interval, which the subscriber provided during configuration, for calls to and from first station 108. However, if a subscriber wishes to override the demarcation interval for a specific call, the subscriber may provide a demarcation interval override as well as a password.

In the process shown in FIG. 4*a*, the subscriber has provided an override demarcation interval and password. The SCP 118 validates the password by querying database 120, 414. If the password is valid, the demarcation interval is set to the value received in the message 416. If the password is invalid, the demarcation interval is set to the default demarcation interval for first station 108, 418. Another embodiment of the present invention ends the communication when the password is invalid. In another embodiment of the present invention, if the subscriber enters an invalid password the SCP 118 instructs the SSP 112*a* to request the password again so that the subscriber may correct the previous error.

Referring again to FIG. 4*a*, once the password is validated or found to be invalid, the SCP 118 sends a response message to the SSP 112*a*, including the demarcation interval that the SSP 112*a* is to apply to the communication and closes the transaction 422. The SSP 112*a* receives the message from the SCP 112*a* and closes the transaction 424.

The SSP 112*a* then routes the communication to second station 110, establishing a voice channel communication link on trunk 122 to SSP 112*a* and begins timing the communication 426. When the demarcation interval expires, the SSP 112*a* executes a demarcation 428. Demarcation may comprise playing a tone, signifying the expiration of the demarcation interval, or may comprise disconnecting the call.

In an embodiment of the present invention, prior to the expiration of the demarcation interval, SSP 112*a* may play a warning tone to inform the individual using the subscriber's phone that the demarcation interval is about to expire. The period of time prior to expiration may comprise one minute or any other period specified by the subscriber or service provider.

The process illustrated in FIG. 4*a* continues in FIG. 4*b*. When the call ends, either because SSP 112*a* ended it after the expiration of the demarcation interval or because the parties to the call ended the call, the SSP 112*a* identifies a trigger and opens a unidirectional link to the SCP 118, 430. The SSP 112*a* then sends the duration of the call to the SCP 118 and closes the transaction 432.

The SCP 118 receives the duration of the communication as well as information identifying aspects of the communication 432. For example, the SSP 112*a* and SCP 118 may use a unique number to identify each call. When the SSP 112*a* communicates the duration of the call, the SSP 112*a* includes the call identifier in the message. The SCP 118 decrements the demarcation interval if necessary, subtracting the duration of the call from the total demarcation interval allowed for the first station 108 or for calls between first station 108 and second station 110, 436. The SCP 118 then closes the transaction 438. The process ends 440.

Origination-Side Demarcated Call Handling in an AIN

The AIN protocol defines a common set of message that AIN components exchange when providing advanced telecommunications services, such as the query message, conversation message, response message and unidirectional message. Certain messages perform specific functions. The messages include the Info_Collected, Analyze_Route and Termination_Notification messages.

Figure 5:
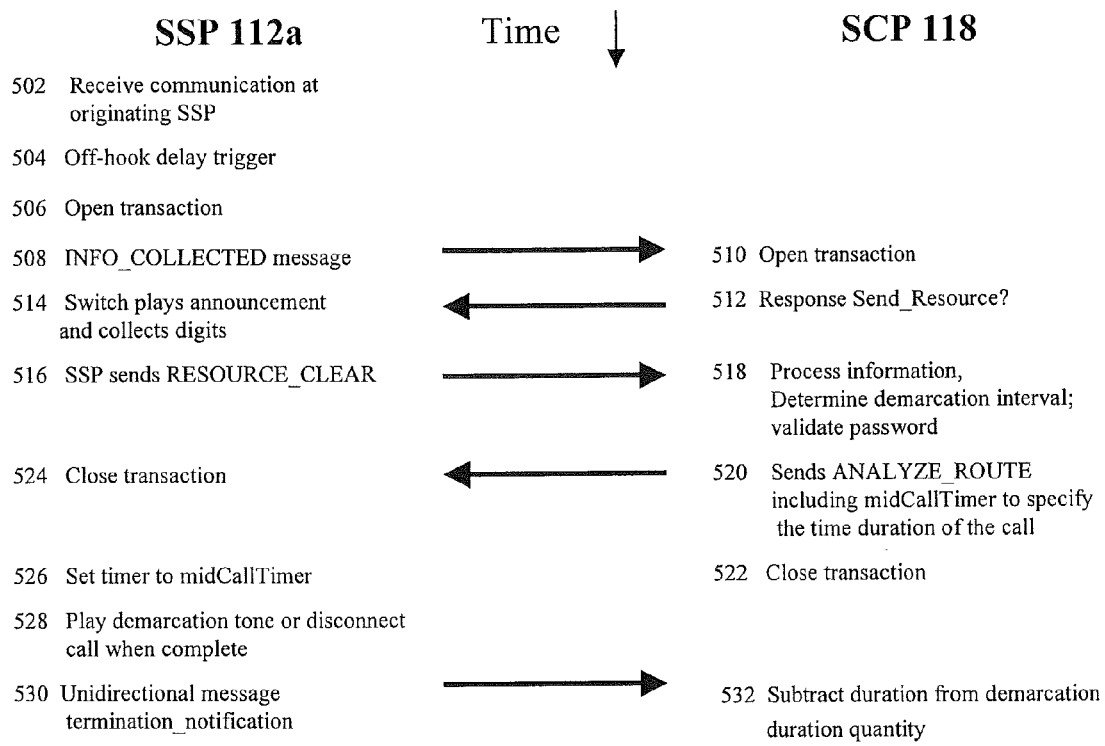
FIG. 5 is a message flow diagram illustrating the process of handling a call in which a demarcation interval applies to the originating station in an embodiment of the present invention.

FIG. 5 is a message flow diagram, illustrating the messages that the SSP 112a and SCP 118 exchange for a demarcated call originating from the subscriber's phone, first station 108, and directed to second station 110. Arrows indicate message flow between SSP 112a and SCP 118 over time.

In the embodiment shown in FIG. 5, the subscriber initiates a telephone call on fist station 108. SSP 112a receives the communication 502. The SSP112a identifies an off-hook delay trigger 504. An off-hook delay trigger allows the SSP 112a to pause and send a message to the SCP 118. For example, if the subscriber dials 911, the SSP 112a escapes the off-hook delay trigger. The SSP 112a immediately routes the call and does not pause while waiting for instructions.

Referring again to FIG. 5, in response to the trigger, the SSP 112a pauses and opens a transaction 506. The SSP 112a sends an Info_Collected message to the SCP 118, including any necessary parameters 508. The SSP 112a and the SCP 118 engage in a bi-directional communication to gather the required demarcation to setup the communication between first station 108 and second station 110. SCP 118 sends a Send_Notification message to the SSP 112a, including an Echo_Data parameter, which is subsequently returned to the SCP 118 in the Termination_Notification message described below. The Echo_Data parameter in each message contains an identification number that serves to identify the specific communication to which the messages apply.

The SCP 118 receives the Info_Collected message and, in response, opens a transaction 510. The SCP 118 performs logic and may query database 120 and then sends a response message, a Send_Resource message 512. The SSP 112a receives the Send_Resource message and, in response, plays an announcement and collect digits 514. Once the SSP 112a finishes collecting digits, the SSP 112a sends a Resource_Clear message, containing the information, to the SCP 118, 516.

The SCP 118 processes the information in the Resource_Clear message, validating a password if necessary and determining the demarcation interval 518. The SCP 118 next sends an Analyze Route message to the SSP 112a, which includes a midCallTimer parameter, and a Send_Notification message, instructing the SSP 112a to notify the SCP 118 upon termination of the communication 520. The midCallTimer parameter contains the demarcation interval for the call. The SCP 118 then closes the transaction 522. The Analyze_Route message may include additional parameters as well, such as an Echo_Data parameter, which includes a unique identification number of the communication and which the SSP 112a will later return to the SCP 118 to identify the communication.

SCP 118 sends a Send_Notification message to the SSP 112a, including an Echo_Data parameter, which is returned to the SCP 118 in the Termination_Notification message. The Echo_Data parameter in each message contains an identification number that serves to identify the specific communication to which the messages apply.

The SSP 112a receives the Analyze_Route message and, in response, closes the transaction 524. The SSP 112a utilizes the midCallTimer parameter to set a timer for the call and routes the call 526.

Assuming the call is answered at second station 110, the timer begins timing the call. When the timer expires, an embodiment of the present invention either plays a demarcation signal or disconnects the call 528. Also, the call may end prior to expiration of the demarcation interval. In any case, when the call ends, the SSP 112a sends a unidirectional Termination_Notification message to the SCP 118, 530.

The Termination_Notification message comprises an identifier of the communication as well as the duration of the call. A Termination_Notification message is a unidirectional message, a message not associated with a transaction. The SCP 118 receives the Termination_Notification message and, if necessary, subtracts the duration of the communication from the demarcation interval remaining in database 120, 532.

Termination-Side Demarcated Call Handling in an AIN

Figure 6:
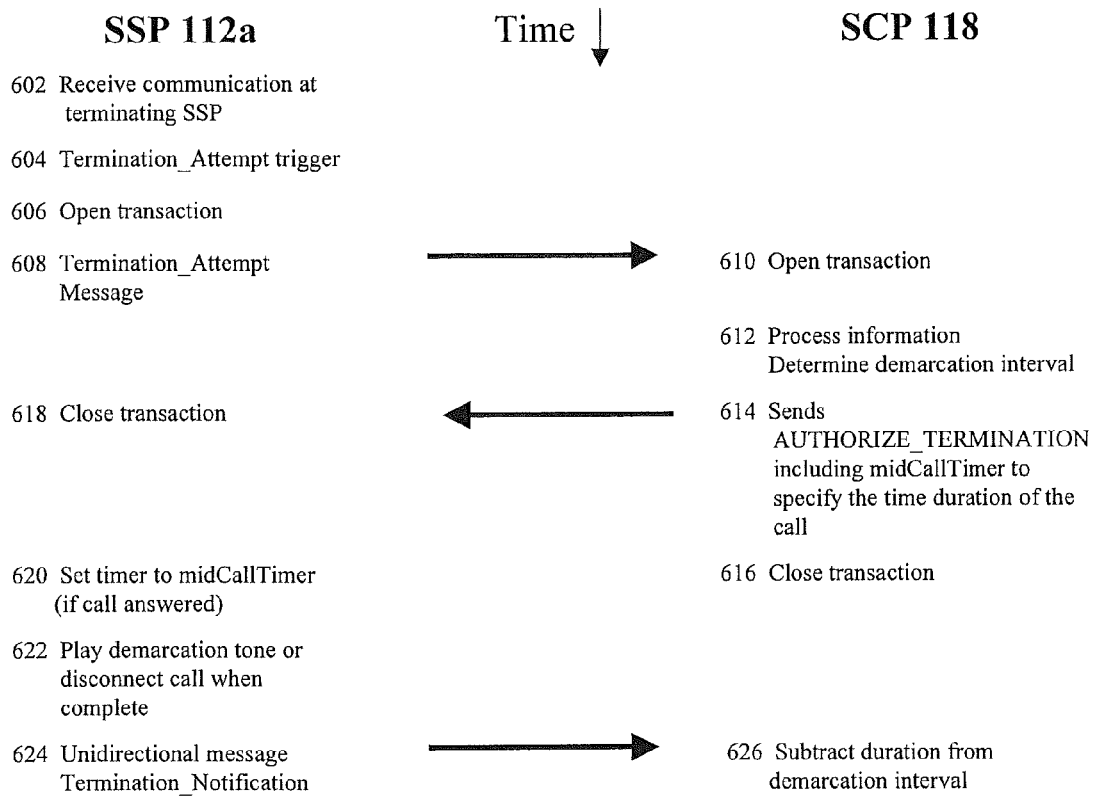
FIG. 6 is a message flow diagram illustrating the process of handling a call in which a demarcation interval applies to the terminating station in an embodiment of the present invention.

FIG. 6 is a message flow diagram, illustrating the messages that the SSP 112a and SCP 118 exchange for a demarcated call originating at second station 110 and directed to the subscriber's phone, first station 108. Horizontal arrows indicate message flow between SSP 112a and SCP 118.

In the embodiment shown in FIG. 6, SSP 112a receives a communication from second station 110, 602. The SSP112a identifies a Termination_Attempt Trigger 604. In response, the SSP 112a pauses and opens a transaction 606. The SSP 112a sends a Termination_Attempt message to the SCP 118, including any necessary parameters 608. The SCP 118 receives the Termination_Attempt message and, in response, opens a transaction 610. The SCP 118 processes the information contained in the Termination_Attempt message and determines the demarcation interval 612. The SCP 118 sends an Authorize_Termination message to the SSP 112a, which includes a midCallTimer parameter, and Send_Notification, instructing the SSP 112a to notify the SCP 118 when the communication ends 614. The midCallTimer parameter specifies the demarcation interval for the call. The SCP then closes the transaction 616.

The SSP 112a receives the Authorize_Termination message and, in response, closes the transaction and connects the call 618. The SSP 112a utilizes the midCallTimer parameter to set a timer for the call 620.

When the timer expires, the SSP 112a either plays a demarcation signal or disconnects the call 622. Also, the call may end prior to expiration of the demarcation interval. In either situation, when the call ends, the SSP 112a sends a unidirectional Termination_Notification message to the SCP 118, 624. The Termination_Notification message comprises an identifier of the communication as well as the duration of the call. The SCP 118 receives the Termination_Notification message and, if necessary, subtracts the duration of the communication from the demarcation interval remaining in database 120, 626.

Subscription-Based Termination-Side Demarcated Call Handling in an AIN

Figure 7:
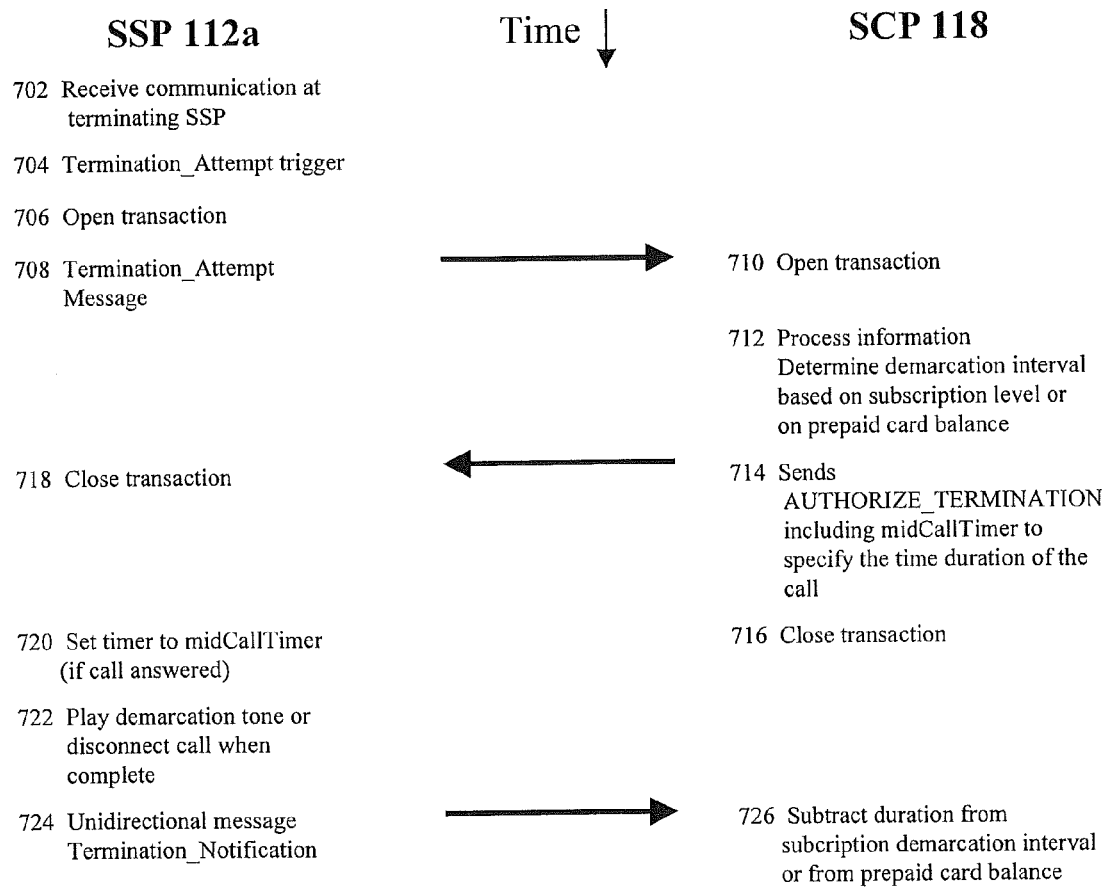
FIG. 7 is a message flow diagram illustrating the process of handling a call in which a demarcation interval applies to the terminating station and the demarcation interval is derived from a subscription or prepaid calling card in an embodiment of the present invention.

Another embodiment of the present invention utilizes subscription information to determine the demarcation interval for a call terminating at the subscriber's phone. The message flow illustrated in FIG. 7 is almost precisely the same as that illustrated in FIG. 6. However, in FIG. 7, the demarcation interval is calculated based on a subscription. The caller does not control the demarcation interval dynamically.

FIG. 7 is a message flow diagram, illustrating the messages that the SSP 112a and SCP 118 exchange for a demarcated call originating at second station 110 and directed to the subscriber's phone, first station 108. As in FIG. 6, horizontal arrows indicate message flow between SSP 112a and SCP 118.

In the embodiment shown in FIG. 7, SSP 112a receives a communication from second station 110, 702. The SSP112a identifies a Termination_Attempt Trigger 704. In response, the SSP 112a pauses and opens a transaction 706. The SSP 112a sends a Termination_Attempt message to the SCP 118, including any necessary parameters 708. The SCP 118 receives the Termination Attempt message and, in response, opens a transaction 710. The SCP 118 processes the information contained in the Termination_Attempt message and determines the demarcation interval 712. The demarcation interval is calculated based on a value specified during subscription to the demarcation service. In the embodiment shown in FIG. 7, the subscriber cannot dynamically vary the demarcation interval.

After determining the demarcation interval, the SCP 118 sends an Authorize_Termination message to the SSP 112a, which includes a midCallTimer parameter, and Send_Notification, instructing the SSP 112a to notify the SCP 118 when the communication ends 714. The midCallTimer parameter specifies the demarcation interval for the call. The SCP then closes the transaction 716.

The SSP 112a receives the Authorize_Termination message and, in response, closes the transaction and connects the call 718. The SSP 112a utilizes the midCallTimer parameter to set a timer for the call 720.

When the timer expires, the SSP 112a either plays a demarcation signal or disconnects the call 722. Also, the call may end prior to expiration of the demarcation interval. In either situation, when the call ends, the SSP 112a sends a unidirectional Termination_Notification message to the SCP 118, 724. The Termination_Notification message comprises an identifier of the communication as well as the duration of the call. The SCP 118 receives the Termination_Notification message and subtracts the duration of the communication, as a time or monetary value, from the demarcation interval remaining in database 120, 726. The monetary value of the duration of the communication is calculated by multiplying the duration of the communication by the billing rate for the communication.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A method for setting a subscriber-specified limit on the duration of a voice channel communication, the method comprising:
   receiving a communication from a subscriber on a first network element, said communication causing said first network element to send a request to a second network element;
   in response to said request, sending a message from said second network element to said first network element, causing said first network element to request entry of demarcation information, wherein said demarcation information comprises a demarcation interval; the demarcation information applying to communications for which a subscriber's directory number is an origination point or a termination point;
   receiving said demarcation information at said first network element; communicating said demarcation information to said second network element, causing said second network element to store said demarcation information; and
   initiating a billing of the subscriber for accepting and enforcing said demarcation information;
   wherein said subscriber provides said demarcation information;
   wherein said demarcation interval specifies at least one of a time interval or a monetary amount; the demarcation information implementing one or more of:
      associating each of a respective plurality of directory numbers of other subscribers with a corresponding demarcation interval, or identifying one or more directory numbers of other subscribers to which a corresponding demarcation interval does not apply, or associating each of a respective plurality of directory numbers of other subscribers with a corresponding default demarcation interval; and
      wherein said demarcation interval applies to all communication on the voice channel between a subscriber directory number and a directory number of the respective plurality of directory numbers of other subscribers, such that the subscriber directory number is either an origination point or a termination point for the communication on the voice channel.

2. The method of claim 1, wherein storing said demarcation information comprises:
   comparing said demarcation interval to a default demarcation interval;
   determining which quantity is a lesser quantity; and
   storing said lesser quantity as said demarcation interval.

3. The method of claim 1, wherein said demarcation information further comprises a time period to which the demarcation interval applies.

4. The method of claim 1, wherein said demarcation information further comprises identification information for a first station participating in said voice channel communication.

5. The method of claim 1, wherein said demarcation information further comprises identification information for a second station participating in said voice channel communication.

6. The method of claim 1, wherein said first network element comprises a service switching point.

7. The method of claim 1, wherein said second network element comprises a service control point.

8. A method for providing a demarcated voice channel communication that is demarcated as specified by a subscriber, the method comprising:
   receiving a communication at a first network element, said communication having identification information associated therewith, including identification information for a first station and a second station;
   providing said identification information from said first network element to a second network element;
   in response to receiving said identification information, said second network element;
      determining a demarcation interval for said communication based on demarcation information provided by a the subscriber, wherein said demarcation interval specifies at least one of a time interval or a monetary amount; the demarcation information applying to communications for which a subscriber's directory number is an origination point or a termination point; the demarcation information implementing one or more of: associating each of a respective plurality of directory numbers of other subscribers with a corresponding demarcation interval, or identifying one or more directory numbers of other subscribers to which a corresponding demarcation interval does not apply, or associating each of a respective plurality of directory numbers of other subscribers with a corresponding default demarcation interval; wherein said demarcation interval applies to all communication on the voice channel between a subscriber directory number and a directory number of the respective plurality of directory numbers of other subscribers, such that the subscriber directory number is either an origination point or a termination point for the communication on the voice channel; and providing a demarcation message to said first network element, said demarcation message including said demarcation interval;

in response to receiving said demarcation message, said first network element:

routing said communication for connection between said first station and said second station, indicating the expiration of said demarcation interval, and initiating a billing of the subscriber for said providing of said demarcated voice channel communication.

9. The method of claim 8, wherein said first network element indicating the expiration of said demarcation interval comprises said first network element playing a demarcation signal, indicating said expiration of said demarcation interval.

10. The method of claim 8, wherein said first network element indicating the expiration of said demarcation interval comprises said first network element effecting the disconnection of said communication.

11. The method of claim 8, wherein said identification information comprises a password, said password causing said second network element to determine that said demarcation interval is infinite.

12. The method of claim 8, wherein said second network element determining said demarcation interval comprises said second network element determining said demarcation interval based on demarcation information relating to said first station, said demarcation information being accessed through said identification information.

13. The method of claim 12, wherein said second network element determining said demarcation interval comprises said second network element determining said demarcation interval based on demarcation information relating to said second station, said demarcation information being accessed through said identification information.

14. The method of claim 8, wherein said second network element determining said demarcation interval comprises said second network element determining said demarcation interval based on a monetary rate for said communication as calculated using said identification information.

15. The method of claim 8, after said first network element playing said demarcation signal, further comprising said first network element effecting the disconnection of said communication.

16. The method of claim 8, further comprising:

after said first network element routing said communication, said first network element: measuring the duration of said communication, and providing the measured duration of said communication to said second network element; and in response to receiving said measured duration of said communication, said second network element deducting said duration from said demarcation interval set by said subscriber.

17. The method of claim 8, wherein said first station is an originating station for said demarcated voice channel communication.

18. The method of claim 8, wherein said first station is a terminating station for said demarcated voice channel communication.

19. The method of claim 8, wherein said first network element comprises a service switching point.

20. The method of claim 8, wherein said second network element comprises a service control point.

21. A system for setting a subscriber-specified limit on the duration of a demarcated voice channel communication, the system comprising:

a first network element, functionally connected to a telecommunications network;

a second network element, functionally connected to said telecommunications network, wherein said second network element comprises:

a subscriber-controlled call demarcation entry component for accepting subscriber-specified demarcation information, and a demarcation information data store, wherein said demarcation information defines a demarcation interval setting forth at least one of a time interval or a monetary amount; the demarcation information applying to communications for which a subscriber's directory number is an origination point or a termination point; the demarcation information implementing one or more of: associating each of a respective plurality of directory numbers of other subscribers with a corresponding demarcation interval, or identifying one or more directory numbers of other subscribers to which a corresponding demarcation interval does not apply, or associating each of a respective plurality of directory numbers of other subscribers with a corresponding default demarcation interval; wherein said demarcation interval applies to all communication on the voice channel between a subscriber directory number and a directory number of the respective plurality of directory numbers of other subscribers, such that the subscriber directory number is either an origination point or a termination point for the communication on the voice channel;

a link functionally connecting said first network element and said second network element; and a billing component for initiating a billing of the subscriber for said providing of said demarcated voice channel communication.

22. The system of claim 21, wherein said demarcation information further comprises a time period to which the demarcation interval applies.

23. The system of claim 21, wherein said demarcation information further comprises identification information for said first station.

24. The system of claim 21, wherein said demarcation information further comprises identification information for a second station.

25. The system of claim 21, wherein said caller-controlled call demarcation entry component further comprises a monetary rate to demarcation interval converter.

26. The system of claim 21, wherein said first network element comprises a service switching point.

27. The system of claim 21, wherein said second network element comprises a service control point.

28. A system for providing a demarcated voice channel communication that is demarcated as specified by a subscriber, the system comprising:

a telecommunications network;

a first network element, functionally connected to said telecommunications network;

a second network element, functionally connected to said telecommunications network, wherein said second network element comprises:

a call demarcation component, and a demarcation information data store for storing demarcation information, wherein said call demarcation component is capable of determining a demarcation interval from the demarcation information; the demarcation information applying to communications for which a subscriber's directory number is an origination point or a termination point; the demarcation information implementing one or more of: associating each of a respective plurality of directory numbers of other subscribers with a corresponding demarcation interval, or identifying one or more directory numbers of other subscribers to which a corresponding demarcation interval does not apply, or associating each of a respective plurality of directory numbers of other subscribers with a corresponding default demarcation interval; wherein said demarcation interval applies to all communication on the voice channel between a subscriber directory number and a directory number of the respective plurality of directory numbers of other subscribers, such that the subscriber directory number is either an origination point or a termination point for the communication on the voice channel;

a link functionally connecting said first network element and said second network element;

a billing component for initiating a billing of the subscriber for said providing of said demarcated voice channel communication; and a first station functionally connected to said first network element, wherein said demarcation information is provided by a subscriber;

and wherein said demarcation information specifies at least one of a time interval or a monetary amount.

29. The system of claim 28, wherein said first network element comprises a demarcation signal component.

30. The system of claim 28, wherein said first network element comprises a communication disconnection component.

31. The system of claim 28, wherein said identification information comprises a password, said password causing said second network element to determine that said demarcation interval is infinite.

32. The system of claim 28, wherein said demarcation information further comprises a first station demarcation interval.

33. The system of claim 28, wherein said demarcation information further comprises a second station demarcation interval.

34. The system of claim 28, wherein said call demarcation component further comprises a monetary rate to demarcation interval converter.

35. The system of claim 28, wherein said first station is an originating station for said demarcated voice channel communication.

36. The system of claim 28, wherein said first station is a terminating station for said demarcated voice channel communication.

37. The system of claim 28, wherein said first network element comprises a service switching point.

38. The system of claim 28, wherein said second network element comprises a service control point.

* * * * *